(No Model.) 2 Sheets—Sheet 1.
W. MERTON.
PNEUMATIC TIRED WHEEL.
No. 575,613. Patented Jan. 19, 1897.
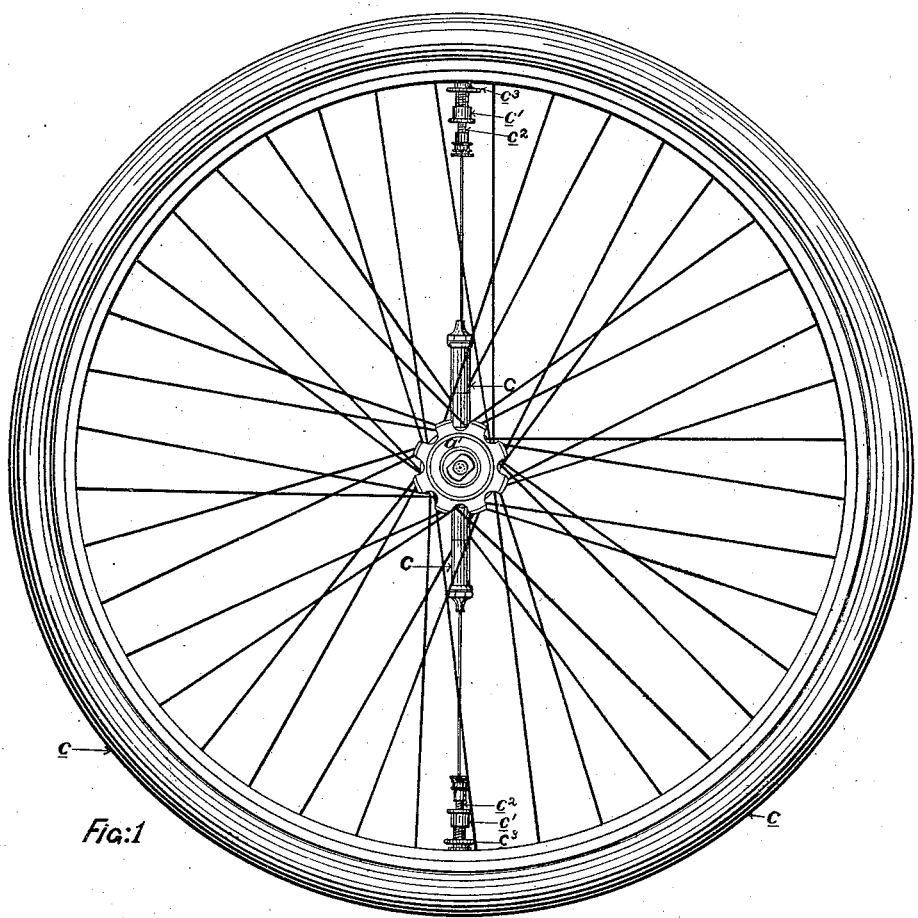
Fig:1
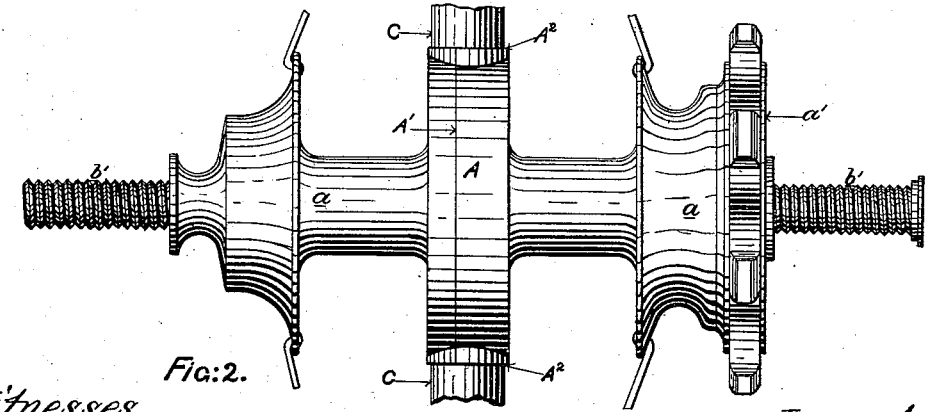
Fig:2
Witnesses.
Thos. A. Gunn
Robert Everett
Inventor.
William Merton.
By James L. Norris.
Atty.

(No Model.) 2 Sheets—Sheet 2.
W. MERTON.
PNEUMATIC TIRED WHEEL.
No. 575,613. Patented Jan. 19, 1897.
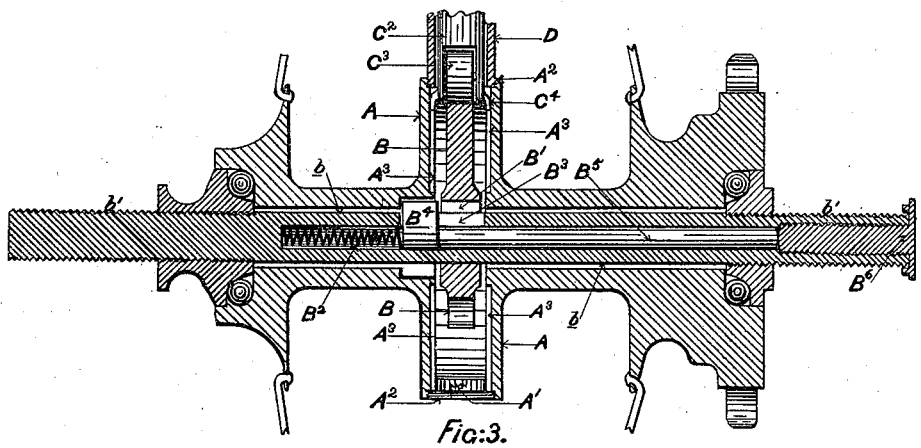
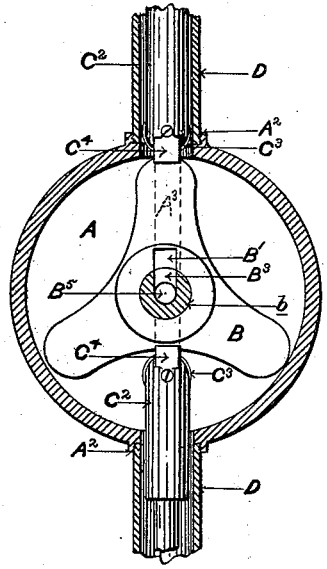
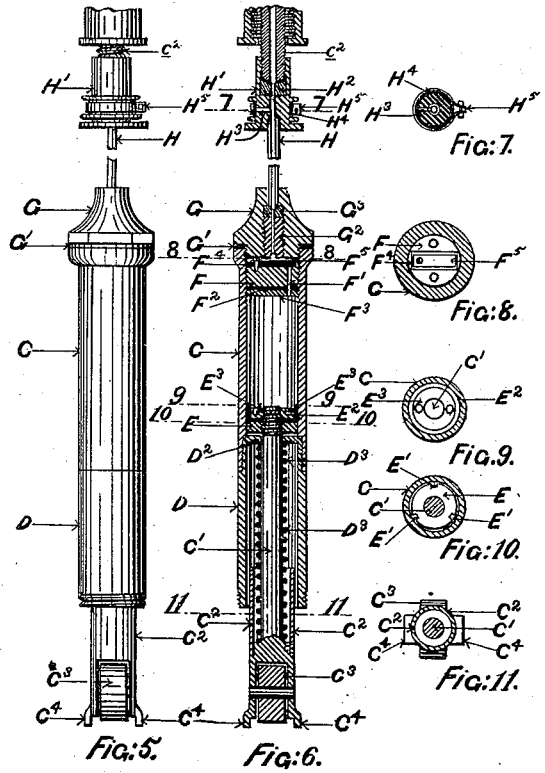
Witnesses.
Inventor.
William Merton.
By James L. Norris.
Atty.

UNITED STATES PATENT OFFICE.

WILLIAM MERTON, OF MARRICKVILLE, NEW SOUTH WALES, ASSIGNOR TO KELSO KING, OF SYDNEY, NEW SOUTH WALES.

PNEUMATIC-TIRED WHEEL.

SPECIFICATION forming part of Letters Patent No. 575,613, dated January 19, 1897.

Application filed October 1, 1896. Serial No. 607,564. (No model.)

*To all whom it may concern:*

Be it known that I, WILLIAM MERTON, watchmaker, a subject of the Queen of Great Britain, residing at Marrickville, near Sydney, in the British Colony of New South Wales, have invented new and useful Improvements in Pneumatic-Tired Wheels to Facilitate the Inflation of the Tire, of which the following is a specification.

This invention refers to those wheels which have an inflatable tire, or, as they are called, "pneumatic-tired" wheels; and it relates to certain improvements in the wheel in the axle and in the inflators or pumps, by means of which the tires are automatically inflated while the wheel, which retains the characteristics of a "balanced" wheel, is revolved around its non-revoluble axle.

The invention consists in features of construction and novel combinations of parts in an automatic tire-inflator, as hereinafter described and claimed, with reference to the accompanying drawings, in which—

Figure 1 is a side elevation of a pneumatic-tired wheel constructed according to these present improvements. Fig. 2 is a longitudinal elevation of the hub or boss of the same, and Figs. 3 and 4 are respectively central longitudinal sectional elevation and central transverse sectional elevation of said hub or boss. Figs. 5 and 6 are elevation and central sectional elevation of an inflator or air-pump and connections, and the other figures are transverse sectional plans of the air-pump and connections at the points on Fig. 6 denoted by corresponding numbers.

The wheel, otherwise than as hereinafter mentioned, is of ordinary construction and has a hub or boss $a$, spokes and rim, and a pneumatic tire $c$, while it revolves upon an axle $b$. When, as shown, the wheel is for a cycle, the axle $b$ has attaching screws or threads $b'$, and the hub or boss has a gear-wheel $a'$. The tire $c$ is provided with ordinary inflating-valve $c'$, and for facility in balancing the wheel and in operating the inflators or air-pumps this is duplicated and said valves placed diametrically opposite one another.

The hub or boss $a$ of the wheel is made with a central enlargement or casing A, inclosing or surrounding a cam B on the non-revoluble axle $b$. In order to the easy making of the casing A, the hub or boss is made in two parts, each terminating centrally in half of such casing, which are brazed or bolted or preferably screwed together, as at A'. On the outer periphery of this casing A are screwed sockets $A^2$ for receiving attaching ends of the inflators or air-pumps and for allowing the engaging part of the operating mechanism of the inflators to pass or protrude through to the axle.

Centrally of the axle $b$ and within a casing A, as hereinbefore described, is balanced cam B, on the edge of which normally rest the ends of air-pump piston-rods passing through the sockets $A^2$ of casing A, though said ends might otherwise engage with said cam, as well understood. The cam B might be permanently keyed or otherwise fastened to the axle, as when the piston-rods are adapted to be held out of reach thereof, but as shown it is free to revolve on said axle until it is desired to make it non-revoluble. In the axle $b$ is a boring or chamber and a slot $B^3$, the inner end of said chamber containing a helical spring $B^2$, the slot holding and guiding a key-piece $B^4$, upon which said spring $B^2$ presses, and the outer part of said chamber being filled by the screwed-in spindle or shank $B^5$ of the key-piece $B^4$ and a screw push-piece $B^6$ having a cap or ornamental head over the axle end. The key-piece $B^4$, guided and held by slot $B^3$, (when the screw $B^6$ moves outwardly on its cap being revolved,) is forced by the spring $B^2$ into the keyway or slot B' of the cam B, and so fastens said cam to the axle until the screw $B^6$ is revolved against the shank $B^5$, and against the power of spring $B^2$ pushes the key-piece $B^4$ clear of the keyway B', when the cam is again free to revolve.

The inflators or air-pumps are preferably in duplicate, placed diametrically opposite one another. Each pump C is in socket $A^2$ of casing A by screwed end D' of distance-piece or annulus D, whose other end $D^2$ forms the head of the pump and a thrush for the end of spring $D^3$, inserted between said head and a flange or recess on the piston-rod C', so as to keep said rod C' normally extended and the piston at the outward end of its stroke. The outer end of the rod C' carries frictionroller $C^3$ and has flanges or shoes $C^4$, so that said roller will easily travel on the edge of cam B, will be retained squarely on said edge, and will be guided by ways or slots $A^3$ in the inner faces of the casing A. The annulus $C^2$ protects the spring $D^3$ from injury, and the annulus D also is a protector not only from injury but from dust and dirt, as well as a distance-piece. The piston is formed of bucket-shaped leather $E^2$ between nuts E and $E^3$ on the end of rod C', the former nut E having admission ports or holes E'. The inner and discharge end of the pump has bottom formed of two nuts F and $F^3$, between which is held the joint-making leather $F^2$, and through the whole of which is the discharge port or passage F'. Over the outer end of port F' is flap-leather $F^4$, kept to its work by flat spring $F^5$. Inward of this bottom is cap G, screwing into pump end and making joint on leather G'. A perforated screw $G^2$ retains a leather or joint piece $G^3$ centrally in this cap to receive thereon the end of the connecting-pipe H to the inflating-valve c' of the tire c, which is of any ordinary approved self-closing pattern, and preferably of that kind known as the "Pneumatic Company's patent." This pipe H terminates in a stuffing-box H', which in turn screws upon the end of the stem $c^2$ of the valve c and compresses upon the end of said stem the leather or packing piece $H^2$. When the pump is secured in place on the enlargement or casing A, as before described, the pipe H joins it to the inflating-valve c. This junction is effected by slackening the fastening-nut $c^3$ of the valve c', so that the stem $c^2$ may be pushed backwardly into the tire and the stuffing-box H' screwed upon said stem $c^2$, and the nut $c^3$ being then tightened the whole of the joints are made airtight. A relief or escape exit is made by a spring-clip $H^5$ over a leather or packing $H^4$, closing a port or hole $H^3$, so that when the tire is sufficiently inflated the pump forces the air through said port $H^3$ instead of into the tire.

To inflate the tire c of the wheel by the above-described devices, it is only necessary to key the cam B to the axle b, as before explained, and then to revolve the wheel either with axle held at rest or, as generally would be done, by propelling or drawing the cycle or vehicle of which the wheel forms part. The motion of the wheel causes the piston-rods C' (pressed against the edge of the cam B) to reciprocate the piston in the pump-barrel and so force air through the port F' under flap-valve $F^4$ through the pipe H and through the valve c into the tire. When the tire is sufficiently inflated, the key $B^4$ is released from the cam B, as before explained, and the wheel will then revolve without operating the air-pumps or inflators.

Having now particularly described and explained the nature of my said invention and in what manner the same is to be performed, I declare that what I claim is—

1. In a pneumatic-tired wheel, the combination with a non-revoluble axle having thereon a cam adapted to be made fast or loose upon said axle, and the wheel-hub provided with a circular enlargement or casing surrounding the axle-cam, of an air-pump cylinder mounted on and communicating with said casing, said pump-cylinder being also in communication with the pneumatic tire, the pump-piston having a piston-rod provided at one end with a roller in contact with the axle-cam, a spring surrounding the piston-rod, and a casing for said spring, substantially as described.

2. In a pneumatic-tired wheel, the combination with a non-revoluble axle having a longitudinal bore or chamber open at one end of said axle and a slot in one side of said axle-bore, of a sliding key-piece mounted in the axle-bore and movable in the axle-slot, a stem attached to one side of said key-piece and inclosed in the axle-bore, a spring at the opposite side of said key-piece, a push-piece inserted in the open end of the axle-bore in contact with the key-piece stem to push back said key-piece against the action of its spring, a cam loosely mounted on the axle and having a keyway to be engaged by the sliding key-piece under the action of its spring when the push-piece is withdrawn, and a wheel-hub having mounted thereon a pump-cylinder in communication with the pneumatic tire and provided with a piston adapted and arranged to be operated from the cam on the non-revoluble axle when said cam is engaged by the sliding key-piece, substantially as described.

3. In a pneumatic-tired wheel, the combination of a non-revoluble axle provided with a sliding key-piece, a cam loosely mounted on said axle and provided with a keyway, means for controlling the engagement of the key-piece with the said cam to make the cam fast or loose on the axle, the wheel-hub provided with a casing for the said axle-cam, a pump-cylinder mounted on said casing in communication therewith and with the pneumatic tire, the pump-piston having its piston-rod in contact with the axle-cam, and a spring for said piston, substantially as described.

4. In a pneumatic-tired wheel, the combination of the non-revoluble axle having a sliding spring-key mounted therein, a cam on said axle, devices adapted to be operated from one end of the axle to engage or disengage the said key and cam, the wheel-hub provided with a hollow enlargement or casing to inclose the axle-cam, and one or more air-pumps communicating with said casing and with the pneumatic tire and adapted to be operated from the cam on the non-revoluble axle when the said cam and the sliding key are engaged, substantially as described.

Dated this 14th day of August, 1896.

WILLIAM MERTON.

Witnesses:
H. EDWIN MOORE,
THOMAS JAMES WARD.